United States Patent
Mansouri

(10) Patent No.: US 10,953,989 B1
(45) Date of Patent: Mar. 23, 2021

(54) HEADREST FOR ACCOMMODATING PONYTAIL OR BUN OF HAIR

(71) Applicant: Safran Seats USA LLC, Gainesville, TX (US)

(72) Inventor: Reza Mansouri, Costa Mesa, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/557,254

(22) Filed: Aug. 30, 2019

(51) Int. Cl.
| B60N 2/80 | (2018.01) |
| B60N 2/806 | (2018.01) |
| B60N 2/809 | (2018.01) |
| B60N 2/868 | (2018.01) |
| B60N 2/885 | (2018.01) |
| B64D 11/06 | (2006.01) |

(52) U.S. Cl.
CPC ............ *B64D 11/0642* (2014.12); *B60N 2/80* (2018.02); *B60N 2/806* (2018.02); *B60N 2/809* (2018.02); *B60N 2/868* (2018.02); *B60N 2/885* (2018.02)

(58) Field of Classification Search
CPC .... B60N 2/868; B60N 2/885; B64D 11/0642; A47C 7/383
USPC .......................... 297/397, 406, 407, 398, 410
See application file for complete search history.

(56) References Cited

U.S. PATENT DOCUMENTS

| 2,464,435 A * | 3/1949 | Conradt | B60R 11/0217 |
| | | | 297/397 |
| 4,154,478 A * | 5/1979 | Cohune | A47Q 7/383 |
| | | | 297/397 |
| 4,883,243 A * | 11/1989 | Herndon | B64D 25/02 |
| | | | 244/122 R |
| 5,275,462 A * | 1/1994 | Pond | A62B 9/04 |
| | | | 297/404 X |
| 6,250,716 B1 * | 6/2001 | Clough | A47C 7/383 |
| | | | 297/408 |
| 6,513,871 B2 * | 2/2003 | Bartels | B60N 2/885 |
| | | | 297/406 X |
| 6,692,071 B2 * | 2/2004 | Fowler | B60N 2/4235 |
| | | | 297/216.12 |
| 7,040,705 B2 * | 5/2006 | Clough | B60N 2/885 |
| | | | 297/410 |
| 7,080,886 B2 * | 7/2006 | Bauer | B60N 2/838 |
| | | | 297/409 |
| 7,144,083 B2 * | 12/2006 | List | B60N 2/885 |
| | | | 297/391 |
| 7,201,448 B2 * | 4/2007 | Williamson | B60N 2/01508 |
| | | | 297/407 |

(Continued)

FOREIGN PATENT DOCUMENTS

| DE | 10 2004 003389 | * | 8/2005 | .............. A47C 7/38 |
| FR | 2811949 A1 | * | 1/2002 | ............ B60N 2/838 |

(Continued)

*Primary Examiner* — Rodney B White
(74) *Attorney, Agent, or Firm* — Kilpatrick Townsend & Stockton LLP

(57) ABSTRACT

Described are headrest assemblies having at least one moveable member that is movable to reconfigure the headrest between: an opened arrangement in which a recess sized for receiving a ponytail or bun of hair is defined between portions of a head-receiving surface of the headrest; and a closed arrangement in which the recess is reduced or eliminated by edges of two members of the headrest being in abutment or adjacent to one another.

16 Claims, 3 Drawing Sheets

(56) References Cited

U.S. PATENT DOCUMENTS

| | | | | |
|---|---|---|---|---|
| 7,213,884 B2* | 5/2007 | Flory | ............ | B60N 2/70 |
| | | | | 297/398 |
| 7,264,313 B2* | 9/2007 | Clough | ............ | B60N 2/885 |
| | | | | 297/407 |
| 7,500,721 B2* | 3/2009 | Beroth | ............ | B60N 2/821 |
| | | | | 297/410 |
| 8,840,182 B2* | 9/2014 | Onji | ............ | B60N 2/868 |
| | | | | 297/406 X |
| 9,028,000 B2* | 5/2015 | Millan | ............ | A47C 7/38 |
| | | | | 297/410 |
| 10,399,474 B2* | 9/2019 | Kapusky | ............ | B60N 2/853 |
| 10,414,312 B2* | 9/2019 | Fredriksson | ............ | B60N 2/879 |
| 10,518,679 B2* | 12/2019 | Leck | | |
| 10,703,485 B2* | 7/2020 | Wilcynski | ............ | B64D 11/0642 |
| 2002/0033628 A1* | 3/2002 | Clough | ............ | B60N 2/885 |
| | | | | 297/410 |
| 2012/0161489 A1* | 6/2012 | Nam | ............ | A47Q 7/38 |
| | | | | 297/406 |
| 2015/0329025 A1* | 11/2015 | Szczygiel | ............ | B60N 2/885 |
| | | | | 297/391 |
| 2016/0272327 A1* | 9/2016 | Baker | ............ | B60N 2/885 |
| 2017/0036634 A1* | 2/2017 | Ohno | ............ | B60N 2/90 |
| 2018/0257533 A1* | 9/2018 | Hayashi | ............ | B60N 2/838 |

FOREIGN PATENT DOCUMENTS

| | | | | | |
|---|---|---|---|---|---|
| FR | 2908023 | A1 * | 5/2008 | ............ | B60N 2/885 |
| FR | 2918008 | A1 * | 1/2009 | ............ | B60N 2/885 |
| FR | 2926502 | A1 * | 7/2009 | ............ | B60N 2/868 |

* cited by examiner

HEADREST FOR ACCOMMODATING PONYTAIL OR BUN OF HAIR

FIELD OF THE INVENTION

The field of the invention relates to headrest assemblies for passenger vehicles such as aircrafts.

BACKGROUND

Passenger comfort can be an important consideration in carrier industries, particularly with air carriers. To this end, most seats in commercial passenger aircraft include features such as armrests and headrests to support different parts of a passenger's body when seated. Many headrests may be provided in adjustable versions, for example, which may allow passengers to adjust positioning of the headrest to accommodate differences in passenger height or preference of angled orientation.

However, notwithstanding such adjustability, headrests may often be uncomfortable for passengers in certain situations. For example, a passenger with hair pulled back into a ponytail or bun may experience discomfort when leaning against a headrest due to the gathered hair acting as a pressure point on the rear of the head. The ponytail or bun furthermore can act as an obstruction that prevents the rear of the head from fully resting against the headrest and instead inclines the head forward into an uncomfortable position that may lead to neck pain, especially after a sustained period of time. With this in mind, most passengers that choose to keep a ponytail when settling into a commercial seat opt to re-adjust the ponytail to be gathered at a high point on top of the head (which may feel unsightly) and/or flip the ponytail up over the top of the seat (which may intrude into living space of passengers seated behind). Overall, many passengers simply choose instead to undo the bun or ponytail altogether (even though this may be unwieldly), in view of the commonly-held conclusion that there is no good way to fly in commercial passenger seats with a ponytail in place.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat includes a seat back and a headrest assembly. The headrest assembly is coupled with an upper portion of the seat back and defines a head-receiving surface. The headrest assembly includes a base, which includes a first base plate and a second base plate configurable between: a first configuration in which the first base plate and the second base plate are arranged adjacent one another to define a substantially continuous portion of the head-receiving surface; and a second configuration in which the first base plate and the second base plate are displaced from one another to at least partially define a recess sized for receiving a ponytail or bun of hair.

In some embodiments, the head-receiving surface includes a leftward portion for receiving a leftward part of a passenger's head. The leftward portion may be positioned to the left of the recess for the ponytail or bun of hair in the second configuration. The head-receiving surface may also include a rightward portion for receiving a rightward part of the passenger's head. The rightward portion may be positioned to the right of the recess for the ponytail or bun of hair in the second configuration.

In some embodiments, the passenger seat further includes first cushioning positioned between the head-receiving surface and the first base plate, and second cushioning positioned between the head-receiving surface and the second base plate. The passenger seat may include a cushioning layer that includes the first cushioning and the second cushioning and extends into the recess.

In some embodiments, the headrest assembly further includes a mesh structure arranged to support a passenger's head when received by the headrest assembly.

In some embodiments, the passenger seat further includes a dress cover positioned over the first base plate and the second base plate and defining at least a portion of the head-receiving surface. In some embodiments, the dress cover extends over the first base plate, into the recess, and over the second base plate.

In some embodiments, the passenger seat further includes a replaceable cover arranged at least partially within the recess and configured for replacement between uses of the seat by different passengers.

In some embodiments, the passenger seat further includes a first side wing pivotally coupled with the first base plate; and a second side wing pivotally coupled with the second base plate. The first side wing and the second side wing may be adjustable relative to the base to adjust an amount of lateral head space defined by the headrest assembly.

According to certain embodiments of the present invention, a headrest assembly includes two members. At least one of the two members may be movable to reconfigure the headrest assembly between: an opened arrangement in which a recess sized for receiving a ponytail or bun of hair is defined between portions of a head-receiving surface of the headrest assembly; and a closed arrangement in which the recess is reduced or eliminated by edges of the two members being in abutment or adjacent to one another.

In some embodiments, the two members include a first base plate and a second base plate, and the headrest assembly further includes: a first linkage extending from a first pivot point to the first base plate; and a second linkage extending from a second pivot point to the second base plate. The first linkage and the second linkage may be curved.

In some embodiments, the first linkage is coupled with the first base plate by a first joint that permits the first base plate to retain a first angular orientation when moving between the opened arrangement and the closed arrangement. In some embodiments, the first joint further permits the first base plate to be moved from the first angular orientation when moving between the opened arrangement and the closed arrangement.

In some embodiments, the headrest assembly further includes a pivot that defines both the first pivot point and the second pivot point.

In some embodiments, the headrest assembly further includes a sliding assembly coupled with the two members and operable to adjust a height of the two members relative to a seat back.

According to certain embodiments of the present invention, a method is provided. The method may include moving a first member of a headrest assembly from adjacent a second member of the headrest assembly to at least partially define a recess within a head-receiving surface of the headrest assembly. The method may further include receiving a ponytail or bun of hair into the recess.

In some embodiments, the method further includes, subsequent to removal of the ponytail or bun of hair from the recess, laterally moving the first member and the second member toward one another to close the recess.

In some embodiments, the method further includes receiving a passenger head against the first member and the second member when the recess is closed.

In some embodiments, the method further includes pivoting a first linkage coupled with the first member; and pivoting a second linkage coupled with the second member. Moving the first member from adjacent the second member may result from the pivoting the first linkage and the second linkage.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide headrest assemblies for passenger seats. While the headrest assemblies are discussed for use with aircraft seats, they are by no means so limited. Rather, embodiments of the headrest assemblies may be used in passenger seats or other seats of any type or otherwise as desired. For example, embodiments may be used on trains, buses, movie theaters, student seating, or any other instance when a headrest for a seat may be useful.

In various embodiments, the headrest assemblies can include one or more movable parts that can be reconfigured to define or reveal a recess that is particularly sized for a ponytail. In use, the recess can receive the ponytail while other portions of the back of the passenger's head can be supported by the headrest on either side of the recess. If a passenger does not have a ponytail, the headrest can be readily reconfigured to obscure or eliminate the recess, which may provide a substantially continuous head-receiving surface akin to what the passenger would normally expect to find in a commercial aircraft seat.

Figure 1:
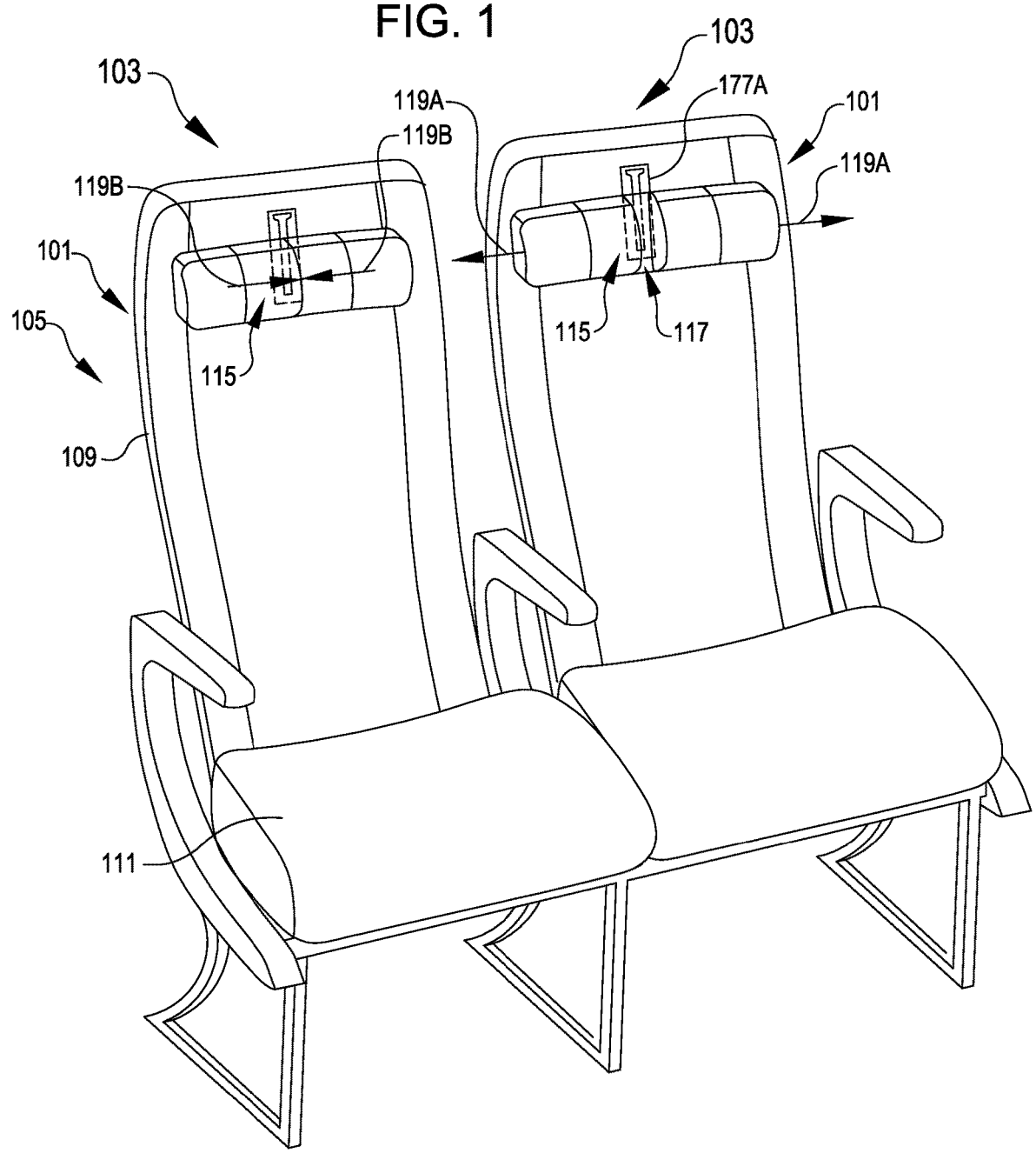
FIG. 1 is a front perspective view of passenger seats with headrest assemblies capable of reconfiguration to provide a recess for accommodating a ponytail or bun of hair according to certain embodiments of the present invention.

According to certain embodiments of the present invention, as shown in FIG. 1, a headrest assembly 101 can be implemented relative to a passenger seat 103 that includes a seat body 105. Two examples of such passenger seats 103 are shown as replicas of one another and alongside one another in FIG. 1 for ease of viewing examples of different states of certain elements, and like reference numbers are used for like features in each.

The seat body 105 can include a seat back 109 and a seat pan 111. The seat back 109 and the seat pan 111 may be fixed relative to one another or movable to one another, e.g., to facilitate suitable recline motion if the passenger seat 103 is reclinable. In some examples, the seat back 109 and the seat pan 111 may be single load-bearing structure.

Respective elements of the seat body 105 may include suitable materials and/or features to facilitate various functions. For example, in various embodiments, the seat pan 111 and the front of the seat back 109 include non-rigid or pliable materials (e.g., fabric, textiles, foam, or other cushioning material) for the comfort of passengers when supported in the passenger seat 103. Other more rigid materials may also be included, such as to reinforce pliable materials, or to provide components for other functions. For example, the seat back 109 on a rear side may include a shroud that is formed from rigid material and that is coupled with cushioning material of the seat back 109. Suitable examples of rigid material that may be used for the shroud and/or other components described herein include, but are not limited to, aluminum, stainless steel, aramid fibers, polycarbonate, polypropylene, other metallic materials, composite materials, or other similar materials. The seat back 109 and/or seat pan 111 can include suitable contouring or other features for facilitating passenger comfort.

The headrest assembly 101 can define a head-receiving surface 115, which may receive a head of a passenger in use. For example, the headrest assembly 101 can be coupled with an upper portion of the seat back 109, which may position the headrest assembly 101 at a suitable location for receiving a passenger's head.

One or more parts of the headrest assembly 101 can be movable to form a recess 117 for receiving a ponytail. This may facilitate comfort for passengers with ponytails, buns, or other forms of hair gathered at the back of the head. The headrest assembly 101 can also be reconfigured to eliminate the recess, for example, which may allow the head-receiving surface 115 to comfortably be used by passengers without ponytails or the like.

Elements of the headrest assembly 101 may be movable in any suitable fashion for opening and/or closing the recess 117. For example, parts of the headrest assembly 101 may move laterally outward (e.g., as illustrated by arrows 119A) to produce the recess 117 and move laterally inward (e.g., as illustrated by arrows 119B) to eliminate the recess 117. However, embodiments are not limited to such arrangements. For example, movement to produce, eliminate, resize, or otherwise adjust the recess 117 may include movement in a different, non-lateral direction, including, but not limited to forward or backward (e.g., moving toward or away from a rear of the seat back 109), or up or down (e.g., moving toward or away from the seat pan 111), or any other suitable direction or combination of directions. As a non-limiting example, the recess 117 may be formed by a retractable segment or group of segments of the head-receiving surface 115 that may be individually or collectively pushed into (or otherwise temporarily received within) the headrest assembly 101 in different combinations to adjust a resulting width or other size of the recess 117. Any suitable form of movable element may be utilized, including, but not limited to, plates, pins, or other movable members.

The recess 117 can be particularly sized to receive or otherwise accommodate a ponytail or bun of hair of a passenger. In some examples, the recess 117 may be 2 inches wide or some other fixed and single width. In some examples, the elements of the headrest assembly 101 can allow a size of the recess 117 to be selected from among a spectrum of sizes, for example, in response to movement of parts that can be moved to and/or releasably fixed at different distances apart from one another.

Figure 2:
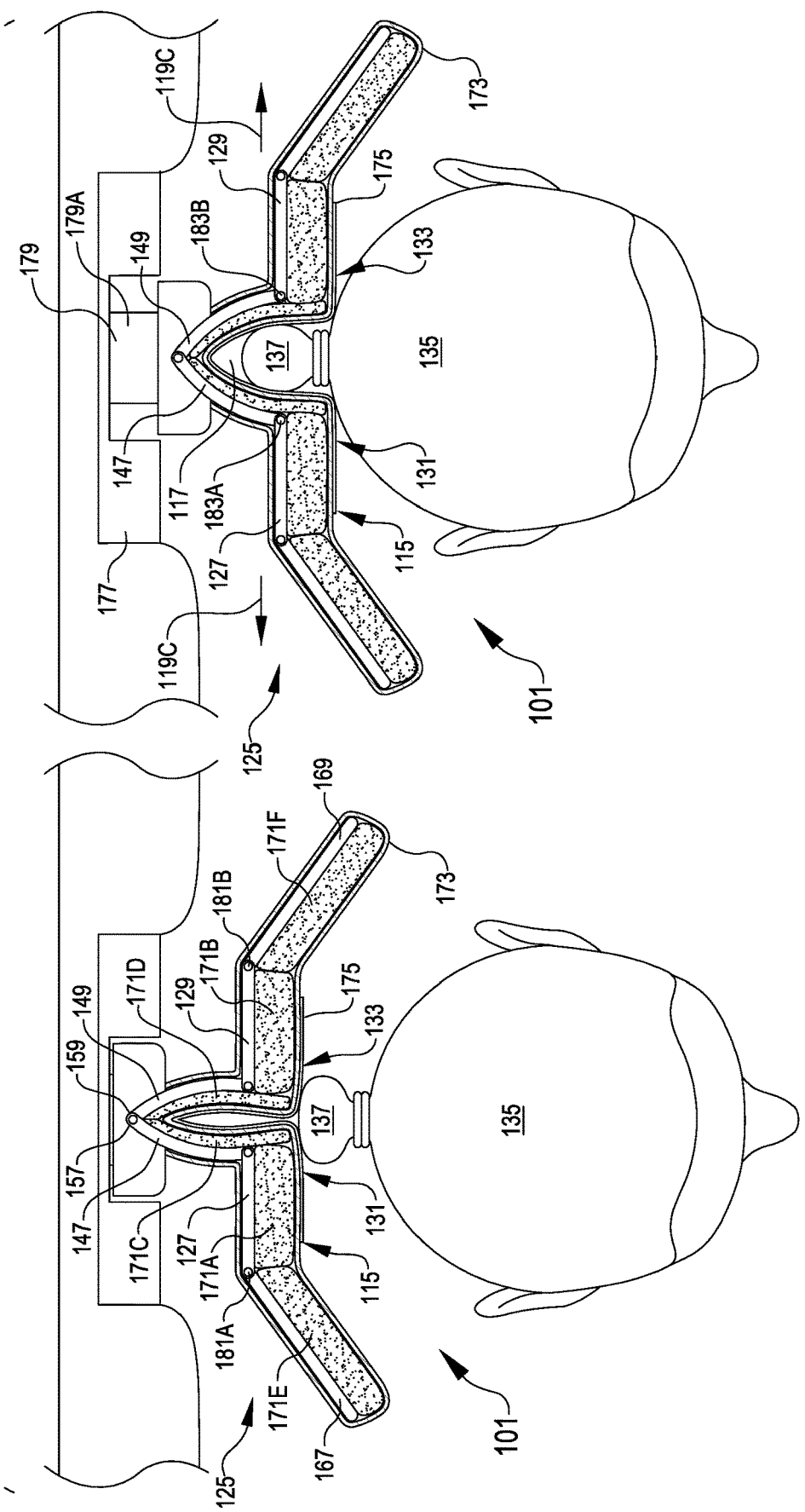
FIG. 2 is a top view of examples of the headrests of FIG. 1.

FIG. 2 is a top view of an example of the arrangement from FIG. 1. The headrest assembly 101 can include a base 125. The base 125 can include two or more members, and at least one of the members may be movable to shift between (1) an opened arrangement in which the recess 117 is present and defined between portions of the head-receiving surface 115 and (2) a closed arrangement in which the recess 117 is reduced or eliminated by edges of the two members being in abutment or adjacent to one another. For example, in FIG. 2, the members include a first base plate 127 and a second base plate 129. As depicted at left in FIG. 2, in the closed arrangement, the first base plate 127 and the second base plate 129 may be arranged with edges adjacent one another to define a substantially continuous portion (or planar portion) of the head-receiving surface 115. As depicted at right in FIG. 2, the first base plate 127 and the second base plate 129 can move laterally (e.g., as at arrows 119C) to separate and reach a state of being displaced from one another to define and/or provide access into the recess 117.

The head-receiving surface 115 may include different portions. For example, the head-receiving surface 115 may include a leftward portion 131 and a rightward portion 133 respectively for receiving a leftward part and a rightward part of a passenger's head 135. When used in the opened arrangement (e.g., as at right in FIG. 2), the leftward portion 131 and the rightward portion 133 can be respectively positioned to the left and right of the recess 117 and can support rear portions of the passenger's head 135 while a ponytail 137 is received in the recess 117. When used in the closed arrangement (e.g., as at left in FIG. 2), the leftward portion 131 and the rightward portion 133 may be adjacent one another. Although such adjacent positioning may be uncomfortable for a ponytail 137, such adjacent positioning may nevertheless be suitable and more comfortable for supporting rear portions of a passenger's head 135 without a ponytail 137, and passengers with a ponytail 137 can avoid the aforementioned discomfort by manipulating or moving the first base plate 127 and/or the second base plate 129 to reconfigure the headrest assembly 101 and make the recess 117 available.

Suitable elements may be included to facilitate relative movement of the first base plate 127 and the second base plate 129. For example, in FIG. 2 the first base plate 127 and the second base plate 129 are shown respectively coupled with a first linkage 147 and a second linkage 149. The first linkage 147 extends from a first pivot point 157 to the first base plate 127, and the second linkage 149 extends from a second pivot point 159 to the second base plate 129. In FIG. 2, the first pivot point 157 and the second pivot point 159 are depicted as corresponding to a shared single pivot, although some embodiments may include separate pivots (e.g., spaced apart laterally or vertically).

In use, the recess 117 may be defined between the first linkage 147 and the second linkage 149. The first linkage 147 and/or the second linkage 149 may be curved. The curvature of the first linkage 147 and/or the second linkage 149 may result in a larger volume of the recess 117 than if straight versions were utilized. Moreover, curved versions may allow suitable reconfiguring movement to be achieved in a smaller space in the forward-backward direction than if straight versions were utilized. In an illustrative example, the first linkage 147 and/or the second linkage 149 may have an arc length of 0.5 to 5 inches and/or a curvature corresponding to an arc angle of between 1.0 and 10 radians, which may allow the recess 117 to be provided without resulting in the head-receiving surface 115 being outside of a range of 0.5 to 4 inches from the seat back 109 that may be suitable for standards set by airlines or other commercial carriers. Any suitable arc length, curvature, and/or other parameter, however, may be utilized to allow the headrest assembly 101 to fit within a given envelope of space.

The headrest assembly 101 can include or be coupled with elements to facilitate comfort of the passenger. As one example, a first side wing 167 can be coupled with the first base plate 127 and a second side wing 169 can be coupled with the second base plate 129. The first side wing 167 and the second side wing 169 each may be pivotally coupled. The first side wing 167 and the second side wing 169 may function as adjustable support surfaces that the passenger's head can be leaned against to support from the side. For example, the first side wing 167 and the second side wing 169 may be adjustable relative to the base 125 to adjust an amount of lateral head space defined by the headrest assembly 101.

The headrest assembly 101 can also include suitable padding or cushioning 171 (e.g., denoted in FIG. 1 in different portions identified with different suffixes A-F). For example, in FIG. 2, the cushioning 171 includes a first cushioning 171A positioned between the head-receiving surface 115 and the first base plate 127. The cushioning 171 in FIG. 2 also includes a second cushioning 171B positioned between the head-receiving surface 115 and the second base plate 129. In some embodiments, the cushioning 171 includes a cushioning layer that includes the first cushioning 171A and the second cushioning 171B and also extends into the recess 117 (e.g., as at 171C and 171D). Additionally or alternatively, the first side wing 167 and/or the second side wing 169 may include or be coupled with respective cushioning portions 171E and/or 171F. Although the cushioning 171 is shown in various segments in FIG. 1, the cushioning 171 may alternatively be continuous in at least some portions.

The headrest assembly 101 can include a dress cover 173. The dress cover 173 may be positioned over other elements or otherwise enclose or contain elements of the headrest assembly 101. For example, the dress cover 173 in FIG. 2 is shown positioned over the cushioning 171, the first base plate 127, the second base plate 129, the first side wing 167, the second side wing 169, the first linkage 147, and the second linkage 149, although other combinations of these and/or elements may be covered. In some examples, the dress cover extends into the recess 117. For example, the dress cover 173 in FIG. 2 extends over the first base plate 127, into the recess 117, and over the second base plate 129. The dress cover 173 may define at least a portion of the head-receiving surface 115. The dress cover 173 may be formed of a fabric or other suitable material for its function.

In some examples, a replaceable cover 175 is included. The replaceable cover 175 may be arranged at least partially within the recess 117. In use, the replaceable cover 175 may facilitate replacement between uses of the seat by different passengers. For example, the replaceable cover 175 may allow one passenger to use the recess 117 for receiving a ponytail 137 without hygienic concerns about a condition of a previous passenger's hair that may have been introduced into the recess 117 if a different replaceable cover 175 was in use for each passenger.

The headrest assembly 101 may include features to allow re-positioning of components. As one example, the headrest assembly 101 can include or be coupled with a vertical adjustment system 177. The vertical adjustment system 177 may allow the base 125 and/or other elements of the headrest assembly 101 to move vertically up or down, such as to adjust for suitable positioning based on a passenger's height. One example of the vertical adjustment system 177 is shown in FIG. 1 as a sliding assembly 177A (e.g., which may include suitable structure for retention and movement along a track), although any suitable mechanisms may be utilized for the vertical adjustment system 177.

As another example of features that allow re-positioning, the headrest assembly 101 can include or be coupled with a forward-aft adjustment system 179. The forward-aft adjustment system 179 may allow the base 125 and/or other elements of the headrest assembly 101 to move forward or aft, such as to adjust for suitable positioning based on a passenger's preferred neck incline angle. In some examples, although opening the recess 117 may reduce a distance of the head-receiving surface 115 from the seat back 109, the forward-aft adjustment system 179 may be utilized to adjust the position of the head-receiving surface 115 to eliminate such reduction or otherwise re-position the head-receiving surface 115 at a desired distance from the seat back 109. Although the forward-aft adjustment system 179 is shown in FIG. 2 by way of example with a telescoping member 179A, any suitable mechanisms (including, but not limited to, devices that may tilt, pivot, or rotate in addition to or as alternatives to linearly translating) may be utilized for the forward-aft adjustment system 179.

Suitable joints may be utilized to connect respective components. For example, as previously noted, the first linkage 147 and the second linkage 149 may be coupled for respectively rotating about the first pivot point 157 and the second pivot point 159. Pivoting of the first linkage 147 and the second linkage 149 may allow the first base plate 127 and the second base plate 129 to move into the aforementioned position of being adjacent or having edges abutting one another. The first base plate 127 and the second base plate 129 may be considered to having edges abutting one another even if other structures (such as cushioning 171, dress cover 173, or replaceable cover 175) are intervening.

As another example of suitable joints, respective hinges or other pivoting joints 181A and 181B may be respectively utilized to couple the first side wing 167 with the first base plate 127 and the second side wing 169 with the second base plate 129. This may allow the first side wing 167 and the second side wing 169 to pivot as noted previously.

As a further example of suitable joints, the first linkage 147 may be coupled with the first base plate 127 by a hinge or other first joint 183A that permits the first base plate 127 to retain a first angular orientation when moving between the opened arrangement and the closed arrangement. Such motion may allow the leftward portion 131 and the rightward portion 133 of the head-receiving surface 115 to remain in alignment with one another (e.g., along a reference plane) regardless of whether in the opened arrangement or closed arrangement. A similar second joint 183B connecting the second base plate 129 with the second linkage 149 may further facilitate such movement.

Figure 3:
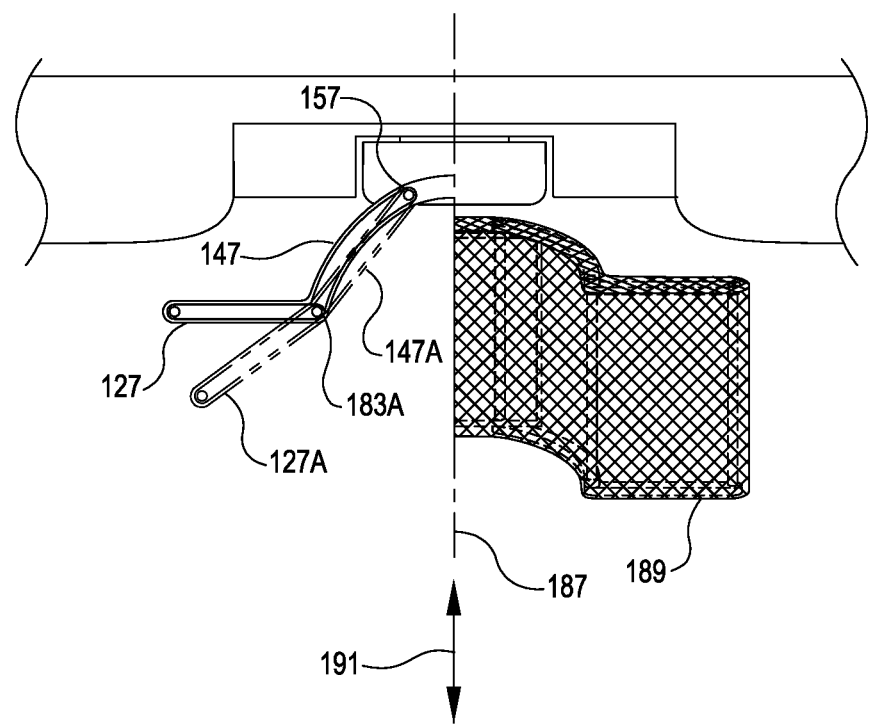
FIG. 3 is a top view of components that may be utilized in the headrests of FIG. 1.

Numerous variations for the headrest assembly 101 are possible, and some are illustrated by way of example in FIG. 3. For example, in some embodiments, in addition to the first joint 183A permitting the first base plate 127 to retain a first angular orientation when moving between the opened arrangement and the closed arrangement (e.g., as depicted in solid line in FIG. 3), the first joint 183A may further (e.g., as depicted in dashed line at 127A in FIG. 3) permit the first base plate 127 to be moved from the first angular orientation when moving between the opened arrangement and the closed arrangement. Such capability may allow the first base plate 127 to function at least partially like the first side wing 167 and may facilitate omission of the first side wing 167. In some examples, the first joint 183A may instead be constrained (e.g., with a portion of the first base plate 127 riding in a track) to prevent the first base plate 127 from being moved from the first angular orientation when moving between the opened arrangement and the closed arrangement.

As previously noted, in some examples, the first linkage 147 is a shape other than curved. For example, where a curved shape of the first linkage 147 is shown in solid lines in FIG. 3, an alternative of a straight shape is shown in broken lines at 147A in FIG. 3.

In some examples, the first pivot point 157 may be positioned offset from a centerline 187 of the headrest assembly 101. Such placement may be relevant when the first pivot point 157 and the second pivot point 159 are independent of one another rather than defined by a single shared pivot.

In some examples, a mesh structure 189 may be utilized in the headrest assembly 101. For example, the mesh structure may be utilized in addition to or as an alternative to the cushioning 171. In some examples, the mesh structure 189 may additionally alternatively replace portions of the first base plate 127, the second base plate 129, the first cushioning 171A, the second cushioning 171B, and/or other elements of the headrest assembly 101. The mesh structure 189 may include sufficient resilience to be able to support at least a part of a passenger's head 135 and/or may include sufficient flexibility to provide a suitable degree of comfort. In some examples, use of a mesh structure 189 may occupy less space than other elements and may allow the headrest assembly 101 to be implemented within a smaller envelope than if the mesh structure 189 were not utilized.

Other variations are also possible. For example, although certain examples herein have described pivoting motion to open the recess 117, in some examples, other types of motion may be utilized. For instance, in some examples, the first base plate 127 and the second base plate 129 may be moved apart from one another in response to connected parts that slide in a track or otherwise move without corresponding pivoting. In some aspects, abutting edges may move relative to one another in a forward or backward direction (e.g., depicted by arrow 191) to define the recess 117, in addition to or as an alternative to moving left or right.

In the following, further examples are described to facilitate the understanding of the invention:

Example 1 is a passenger seat, comprising: a seat back; a headrest assembly coupled with an upper portion of the seat back and defining a head-receiving surface, the headrest assembly comprising a base, the base comprising a first base plate and a second base plate configurable between: a first configuration in which the first base plate and the second base plate are arranged adjacent one another to define a substantially continuous portion of the head-receiving surface; and a second configuration in which the first base plate and the second base plate are displaced from one another to at least partially define a recess sized for receiving a ponytail or bun of hair.

Example 2 is the passenger seat of any of the preceding or subsequent examples, wherein, the head-receiving surface comprises: a leftward portion for receiving a leftward part of a passenger's head, the leftward portion being positioned to the left of the recess for the ponytail or bun of hair in the second configuration; and a rightward portion for receiving a rightward part of the passenger's head, the rightward portion being positioned to the right of the recess for the ponytail or bun of hair in the second configuration.

Example 3 is the passenger seat of any of the preceding or subsequent examples, further comprising: first cushioning positioned between the head-receiving surface and the first base plate; and second cushioning positioned between the head-receiving surface and the second base plate.

Example 4 is the passenger seat of any of the preceding or subsequent examples, further comprising a cushioning layer that comprises the first cushioning and the second cushioning and extends into the recess.

Example 5 is the passenger seat of any of the preceding or subsequent examples, wherein the headrest assembly further comprises a mesh structure arranged to support a passenger's head when received by the headrest assembly.

Example 6 is the passenger seat of any of the preceding or subsequent examples, further comprising a dress cover positioned over the first base plate and the second base plate and defining at least a portion of the head-receiving surface.

Example 7 is the passenger seat of any of the preceding or subsequent examples, wherein the dress cover extends over the first base plate, into the recess, and over the second base plate.

Example 8 is the passenger seat of any of the preceding or subsequent examples, further comprising a replaceable cover arranged at least partially within the recess and configured for replacement between uses of the seat by different passengers.

Example 9 is the passenger seat of any of the preceding or subsequent examples, further comprising: a first side wing pivotally coupled with the first base plate; and a second side wing pivotally coupled with the second base plate, wherein the first side wing and the second side wing are adjustable relative to the base to adjust an amount of lateral head space defined by the headrest assembly.

Example 10 is a headrest assembly comprising two members, at least one of the two members being movable to reconfigure the headrest assembly between: an opened arrangement in which a recess sized for receiving a ponytail or bun of hair is defined between portions of a head-receiving surface of the headrest assembly; and a closed arrangement in which the recess is reduced or eliminated by edges of the two members being in abutment or adjacent to one another.

Example 11 is the headrest assembly of any of the preceding or subsequent examples, wherein the two members comprise a first base plate and a second base plate, and wherein the headrest assembly further comprises: a first linkage extending from a first pivot point to the first base plate; and a second linkage extending from a second pivot point to the second base plate.

Example 12 is the headrest assembly of any of the preceding or subsequent examples, wherein the first linkage and the second linkage are curved.

Example 13 is the headrest assembly of any of the preceding or subsequent examples, wherein the first linkage is coupled with the first base plate by a first joint that permits the first base plate to retain a first angular orientation when moving between the opened arrangement and the closed arrangement.

Example 14 is the headrest assembly of any of the preceding or subsequent examples, wherein the first joint further permits the first base plate to be moved from the first angular orientation when moving between the opened arrangement and the closed arrangement.

Example 15 is the headrest assembly of any of the preceding or subsequent examples, further comprising a pivot that defines both the first pivot point and the second pivot point.

Example 16 is the headrest assembly of any of the preceding or subsequent examples, further comprising a sliding assembly coupled with the two members and operable to adjust a height of the two members relative to a seat back.

Example 17 is a method comprising: moving a first member of a headrest assembly from adjacent a second member of the headrest assembly to at least partially define a recess within a head-receiving surface of the headrest assembly; and receiving a ponytail or bun of hair into the recess.

Example 18 is the method of any of the preceding or subsequent examples, further comprising: subsequent to removal of the ponytail or bun of hair from the recess, laterally moving the first member and the second member toward one another to close the recess.

Example 19 is the method of any of the preceding or subsequent examples, further comprising receiving a passenger head against the first member and the second member when the recess is closed.

Example 20 is the method of any of the preceding or subsequent examples, further comprising: pivoting a first linkage coupled with the first member; and pivoting a second linkage coupled with the second member; wherein the moving the first member from adjacent the second member results from the pivoting the first linkage and the second linkage.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat, comprising:
a seat back;
a headrest assembly coupled with an upper portion of the seat back and defining a head-receiving surface, the headrest assembly comprising a base, the base comprising a first base plate and a second base plate configurable between:

a first configuration in which the first base plate and the second base plate are arranged adjacent one another to define a substantially continuous portion of the head-receiving surface; and a second configuration in which the first base plate and the second base plate are displaced from one another to at least partially define a recess sized for receiving a ponytail or bun of hair; and a replaceable cover arranged at least partially within the recess and configured for replacement between uses of the seat by different passengers.

2. The passenger seat of claim 1, wherein, the head-receiving surface comprises:

a leftward portion for receiving a leftward part of a passenger's head, the leftward portion being positioned to the left of the recess for the ponytail or bun of hair in the second configuration; and a rightward portion for receiving a rightward part of the passenger's head, the rightward portion being positioned to the right of the recess for the ponytail or bun of hair in the second configuration.

3. The passenger seat of claim 1, further comprising:

first cushioning positioned between the head-receiving surface and the first base plate; and second cushioning positioned between the head-receiving surface and the second base plate.

4. The passenger seat of claim 3, further comprising a cushioning layer that comprises the first cushioning and the second cushioning and extends into the recess.

5. The passenger seat of claim 1, wherein the headrest assembly further comprises a mesh structure arranged to support a passenger's head when received by the headrest assembly.

6. The passenger seat of claim 1, further comprising a dress cover positioned over the first base plate and the second base plate and defining at least a portion of the head-receiving surface.

7. The passenger seat of claim 6, wherein the dress cover extends over the first base plate, into the recess, and over the second base plate.

8. The passenger seat of claim 1, further comprising:

a first side wing pivotally coupled with the first base plate; and a second side wing pivotally coupled with the second base plate, wherein the first side wing and the second side wing are adjustable relative to the base to adjust an amount of lateral head space defined by the headrest assembly.

9. A headrest assembly comprising two members, at least one of the two members being movable to reconfigure the headrest assembly between:

an opened arrangement in which a recess sized for receiving a ponytail or bun of hair is defined between portions of a head-receiving surface of the headrest assembly; and a closed arrangement in which the recess is reduced or eliminated by edges of the two members being in abutment or adjacent to one another;

wherein the two members comprise a first base plate and a second base plate, and wherein the headrest assembly further comprises:

a first linkage extending from a first pivot point to the first base plate, wherein the first linkage is coupled with the first base plate by a first joint that permits the first base plate to retain a first angular orientation when moving between the opened arrangement and the closed arrangement; and a second linkage extending from a second pivot point to the second base plate.

10. The headrest assembly of claim 9, wherein the first linkage and the second linkage are curved.

11. The headrest assembly of claim 9, wherein the first joint further permits the first base plate to be moved from the first angular orientation when moving between the opened arrangement and the closed arrangement.

12. The headrest assembly of claim 9, further comprising a pivot that defines both the first pivot point and the second pivot point.

13. The headrest assembly of claim 9, further comprising a sliding assembly coupled with the two members and operable to adjust a height of the two members relative to a seat back.

14. A method comprising:

pivoting a first linkage coupled with a first member of a headrest assembly; and pivoting a second linkage coupled with a second member of the headrest assembly;

as a result from the pivoting the first linkage and the second linkage, moving the first member of the headrest assembly from adjacent the second member of the headrest assembly to at least partially define a recess within a head-receiving surface of the headrest assembly, wherein the first linkage is coupled with the first member by a first joint that permits the first member to retain a first angular orientation during said moving; and receiving a ponytail or bun of hair into the recess.

15. The method of claim 14, further comprising:

subsequent to removal of the ponytail or bun of hair from the recess, laterally moving the first member and the second member toward one another to close the recess.

16. The method of claim 15, further comprising receiving a passenger head against the first member and the second member when the recess is closed.

* * * * *